Sept. 17, 1940.  F. N. LA CHAPELLE  2,214,741
LASTING MACHINE
Filed March 10, 1939  7 Sheets-Sheet 1

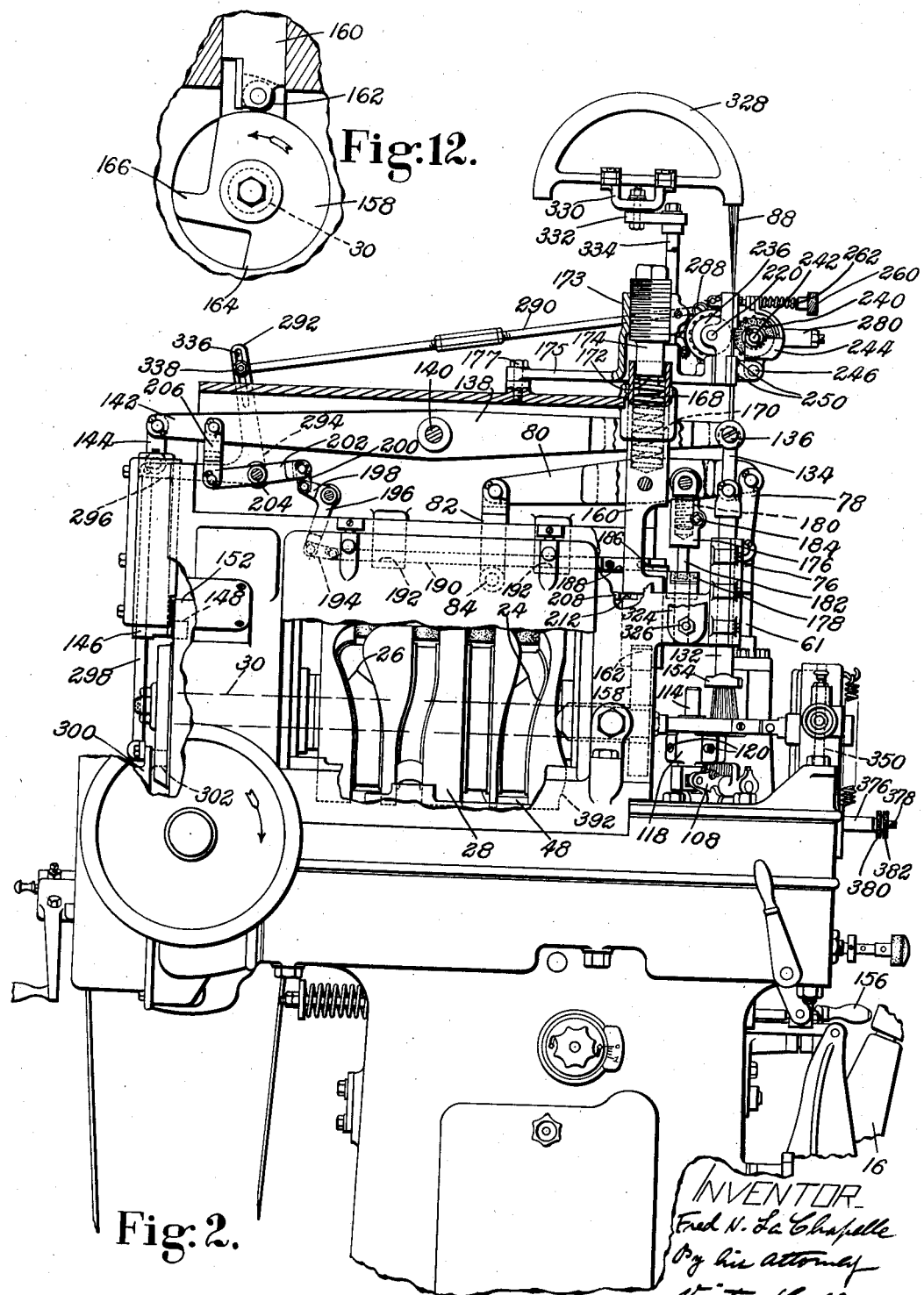
Sept. 17, 1940. F. N. LA CHAPELLE 2,214,741
LASTING MACHINE
Filed March 10, 1939 7 Sheets-Sheet 2

Sept. 17, 1940.  F. N. LA CHAPELLE  2,214,741
LASTING MACHINE
Filed March 10, 1939  7 Sheets-Sheet 3
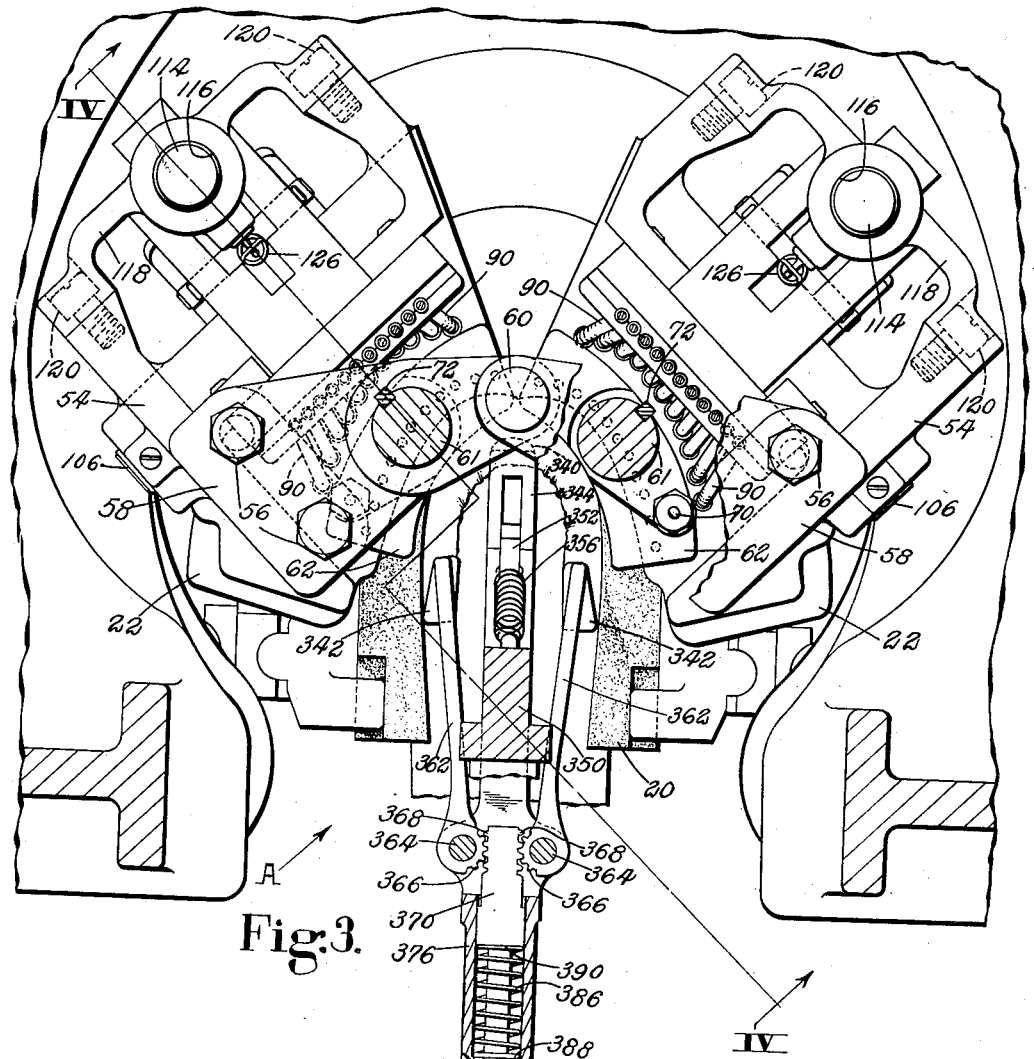
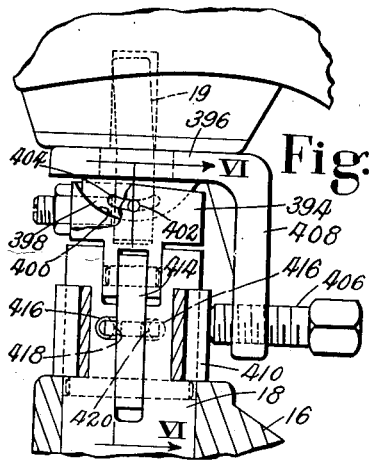
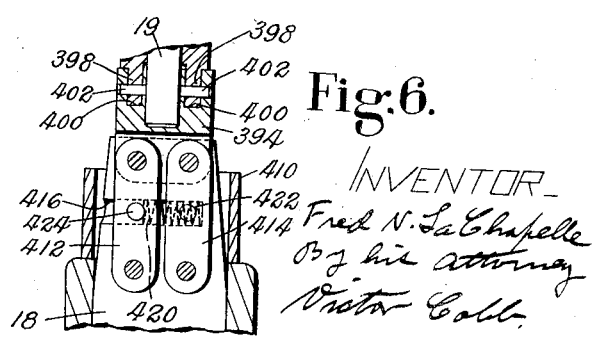

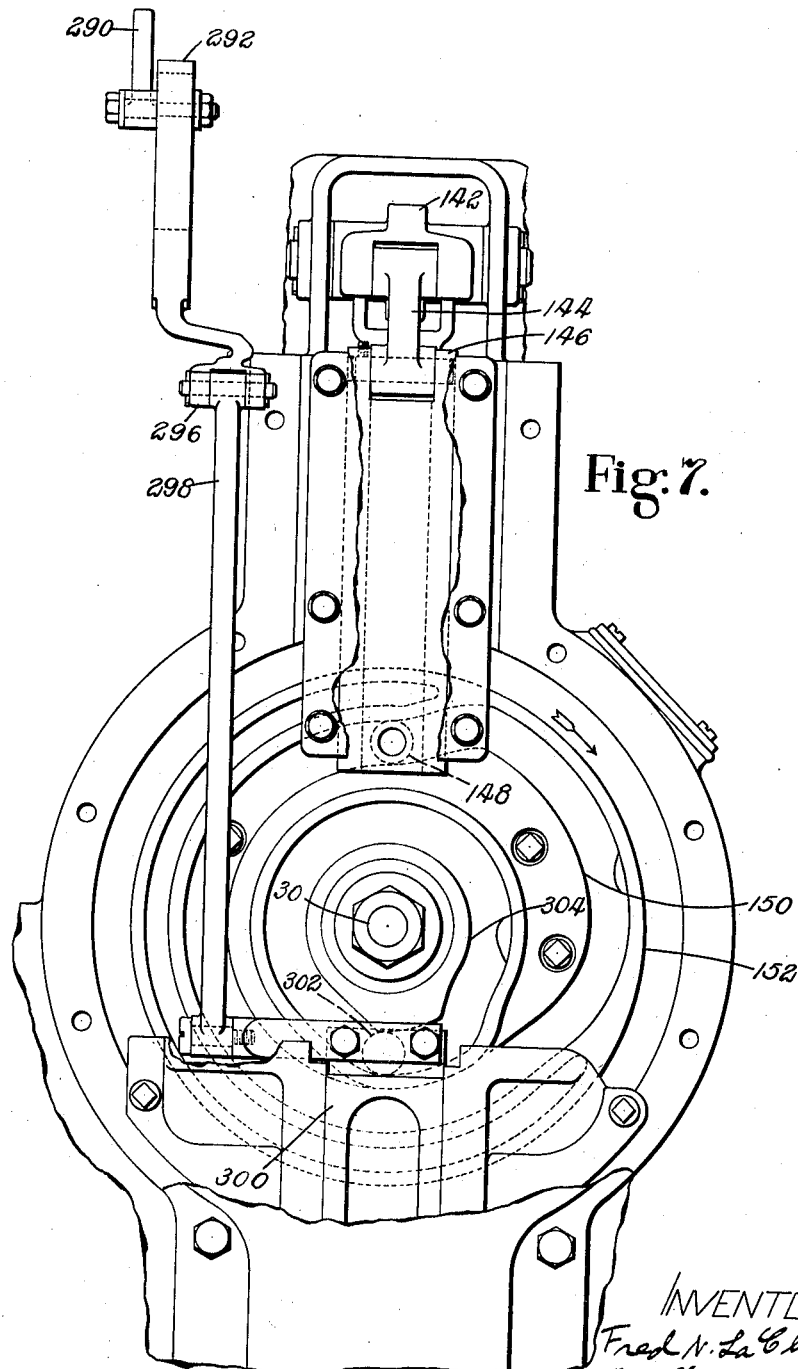

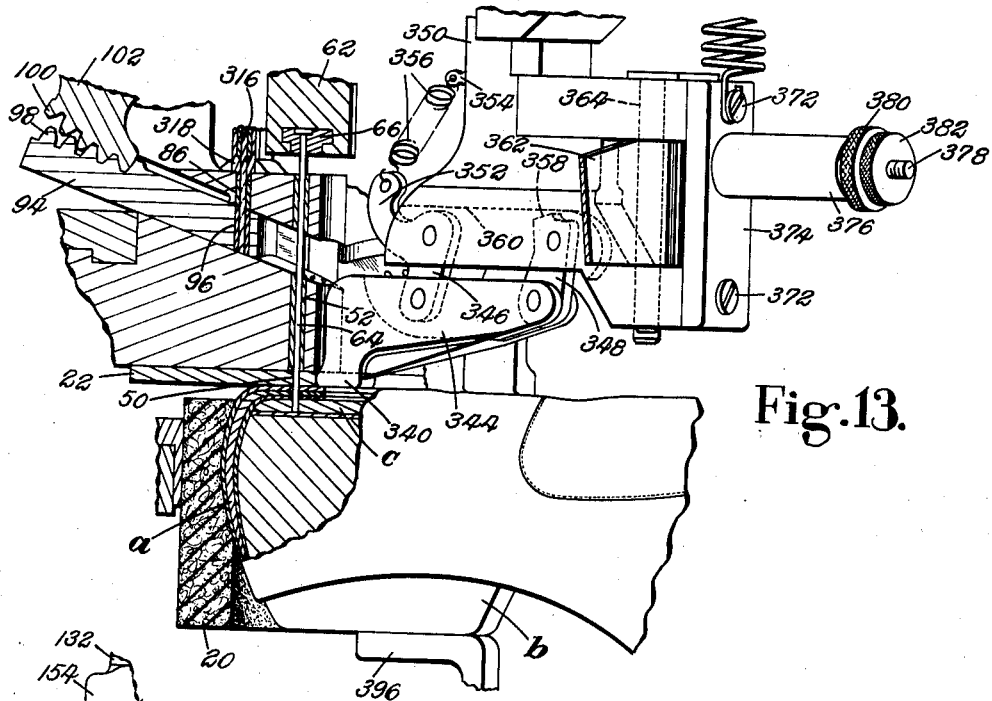
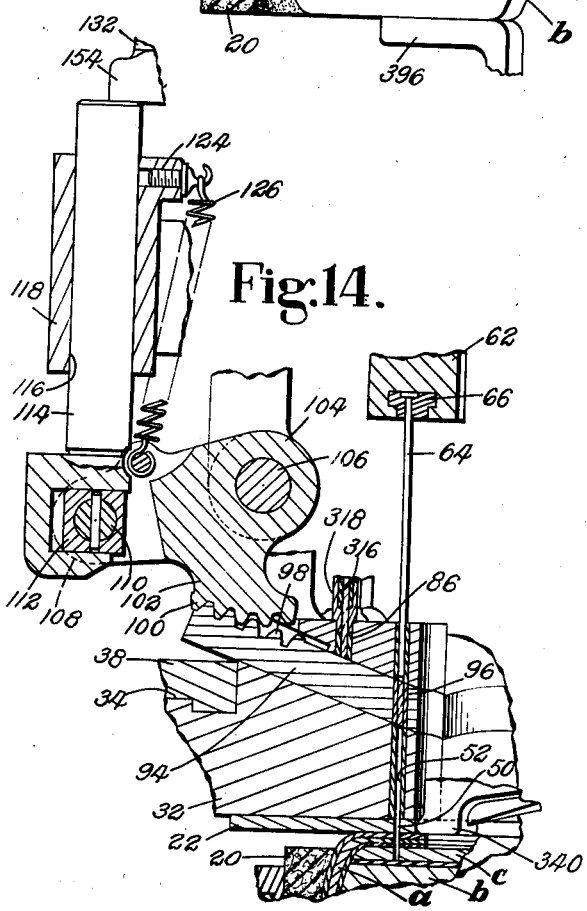
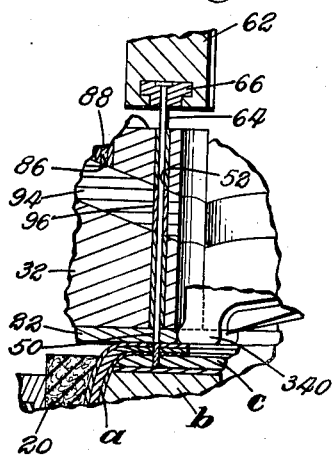

Patented Sept. 17, 1940

2,214,741

UNITED STATES PATENT OFFICE 2,214,741

LASTING MACHINE

Fred N. La Chapelle, Beverly, Mass., assignor to United Shoe Machinery Corporation, Borough of Flemington, N. J., a corporation of New Jersey Application March 10, 1939, Serial No. 260,955

27 Claims. (Cl. 12—4)

This invention relates to lasting machines and more particularly in some aspects to heel-end lasting machines. It is herein illustrated as embodied in a machine of the same general type as that disclosed in Letters Patent of the United States No. 2,059,241, granted on November 3, 1936, upon an application of J. C. Jorgenson, although it is to be understood that in various novel aspects the invention is not limited to machines of the illustrated type or to machines for lasting the heel ends of shoes.

Machines of the type shown in the above-mentioned Letters Patent are each provided with wipers for wiping the margin of the heel end of an upper inwardly over a shoe bottom part, such as an insole or a sole, mounted on a last, and a plurality of tools or drivers for driving fastenings, such as tacks, through openings in the wipers to fasten the upper. It has been proposed heretofore to fasten the upper in lasted position by the use of fiber fastenings or pegs, i. e., for example, fastenings of the character disclosed in United States Letters Patent No. 1,729,169, granted on September 24, 1929, upon an application of mine, in order to obviate any danger that there may be, if metallic fastenings were used, of deflecting or causing improper clinching of fastenings inserted in substantially the same relation to the edge of the shoe bottom in a later operation on the shoe.

An object of the invention is to provide a machine for lasting the heel ends of shoes particularly adapted for use in inserting fastenings of the above-mentioned character. With this general object in view, the machine herein shown is so constructed that the above-mentioned tools are operated alternately as awls to form fastening-receiving holes in the overwiped margin of the upper and in the sole in alinement with the openings in the wipers and as drivers to drive fastenings into the holes to fasten the margin in overwiped position. As illustrated, there are provided members movable inwardly with the wipers in fixed relation thereto and having a plurality of passages formed therein for the drivers in alinement with the openings in the wipers and a plurality of similar passages arranged to receive the ends of a plurality of strips of fiber fastening material. Mounted on the above-mentioned members are loader blocks provided with a plurality of passages arranged to be positioned in alinement with the fastening-material-receiving passages in the members, the loader blocks being movable relatively to the wipers between alternate reciprocations of the tools to sever fiber pegs from the strips of fastening material and to present the pegs in alinement with the openings in the wipers. Novel features are also to be recognized in mechanism for operating and controlling the tools. As herein shown, there is provided a lever for operating the tools alternately as awls and as drivers, means for imparting to the lever a plurality of swinging movements, a stop, and means for engaging the stop at different times in alternate swinging movements of the lever to vary the extent of its swinging movements and thus cause the tools to penetrate and form fastening-receiving holes in the work and then to drive the fastenings into the holes, at which time the tools stop substantially flush with the lower or wiping faces of the wipers.

In lasting the heel ends of shoes it is desirable that each shoe be positioned in such relation to the wipers that the latter will apply substantially equal pressures on the opposite sides of the heel seat. For thus positioning each shoe, the invention provides improved shoe-positioning means, the means herein shown comprising a plurality of presses feet arranged to engage the margin of the upper on the bottom of the shoe at the end and at the opposite sides of the heel seat to position the heel seat face of each shoe in a plane substantially parallel to the plane of the wipers. More particularly, as illustrated, the presser feet are arranged in the path of movement of the wipers and are moved inwardly over the margin of the upper by engagement of the wipers therewith in the overwiping operation, the side presser feet being preferably adjustable toward or from each other laterally of the shoe to accommodate shoes of different widths. As a further feature the invention provides novel shoe-supporting means comprising the usual spindle for engaging the heel end of the last in its spindle hole, and means for supporting the spindle against tipping movement while permitting it to be moved bodily in either direction laterally of the shoe by the action of the last thereon as the upper materials are clamped about the heel end of the last by the usual clamping means provided in machines of the illustrated type. In the construction shown, this means comprises a pair of parallel links that are held normally in a centralized position by spring means against the resistance of which they are movable with the spindle in either direction laterally of the shoe. As the heel end of the shoe is thus centralized relatively to the wipers by the clamping means its heel seat face is maintained in the plane determined by the above-mentioned shoe-positioning means. Preferably, as shown, separate means is provided for permitting the shoe to be tipped lengthwise relatively to the spindle by engagement with the shoe-positioning means to position the heel seat in proper relation to the plane of the wipers.

The above and other features of the invention, including various novel details of construction and combinations of parts, will now be more particularly described by reference to the accompanying drawings and pointed out in the claims.

In the drawings,

Fig. 2 is a view of the same portion in left-hand side elevation with parts broken away and parts in section;

Fig. 3 is a view partly in plan and partly in section of a portion of the structure, showing the wipers, the shoe-positioning means and a portion of the fastening-severing and -inserting means;

Fig. 5 is a view partly in section and partly in side elevation showing the means for supporting a shoe at its heel end;

Fig. 6 is a section on the line VI—VI of Fig. 5;

Fig. 7 is a view in rear elevation of the head of the machine;

Fig. 12 is a detail view on an enlarged scale showing the cam for retracting the drivers and for tensioning their operating spring;

Fig. 13 is a view, looking in the direction of the arrow A in Fig. 3, partly in elevation and partly in section, showing certain details of the wiping, fiber-peg-severing and -inserting means and the shoe-positioning means, and illustrating the relation of these parts to the shoe at the end of the work-penetrating movement of the drivers;

Figure 1:
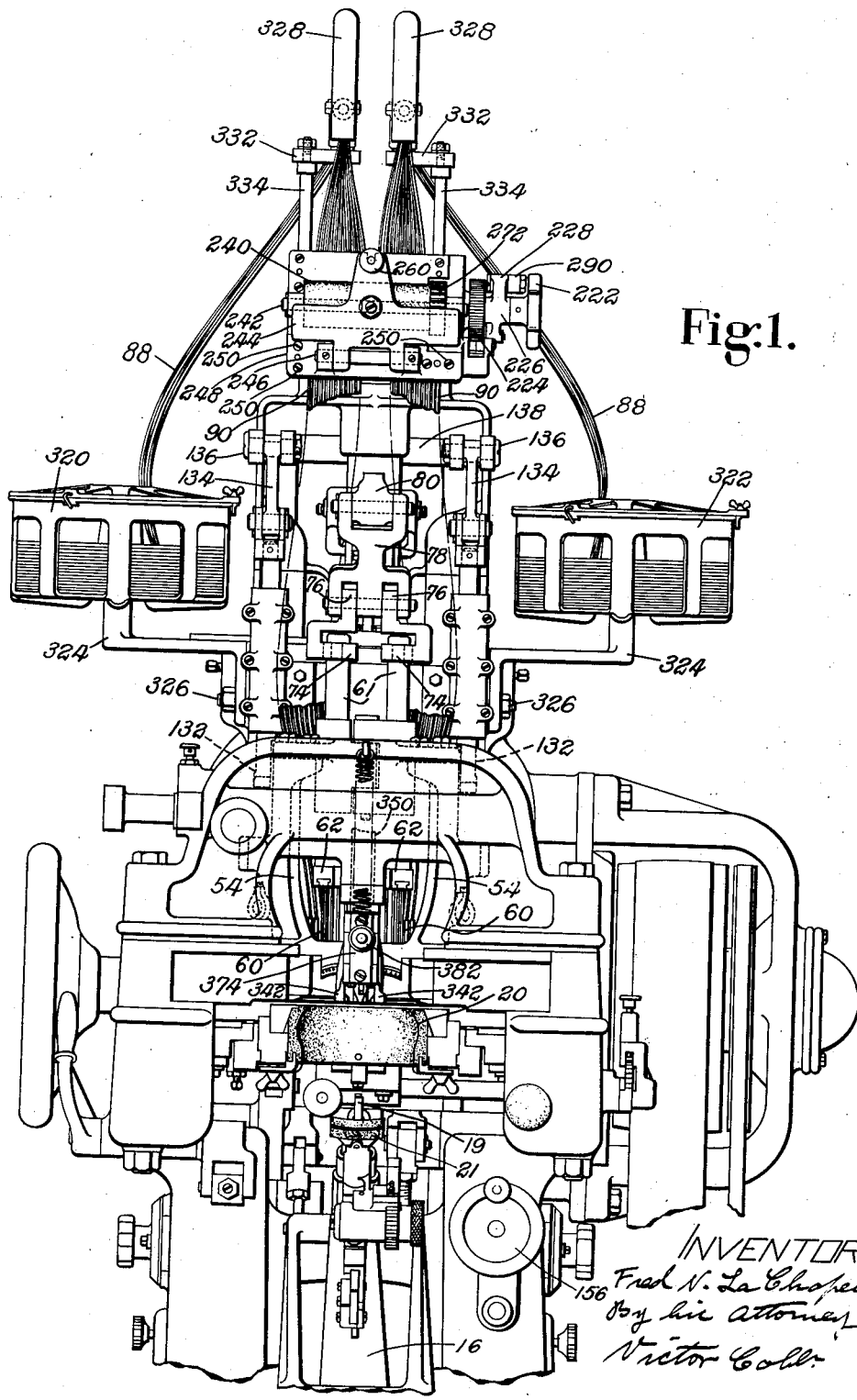
Fig. 1 is a view in front elevation of the upper portion of a machine in which the invention is embodied.

Fig. 14 is a view similar to a portion of Fig. 13, but including more of the mechanism for severing the fiber pegs and presenting them in alinement with the drivers, and illustrating the positions of the parts between successive reciprocations of the drivers; and Fig. 15 is a view similar to a portion of Fig. 14 with the parts in the positions which they occupy at the end of the fastening-inserting operation.

Since the general features of the type of lasting machine herein shown are described in Letters Patent No. 2,059,241, previously referred to, only such portions of the illustrated machine as it is necessary to refer to for a complete understanding of the present invention will be herein described in detail. Machines of this type are designed especially for the shaping of shoe upper materials *a* (herein referred to inclusively as the upper) about the heel end of a last *b* and include means for wiping the margin of the upper inwardly over a sole or insole *c*, and means hereinafter more particularly referred to for driving a plurality of fastenings to fasten the margin of the upper in overwiped position. For supporting the shoe and last there is provided a jack, not shown in detail but comprising the usual casing 16 having vertically movable therein a jack post 18 carrying at its upper end a heel pin or spindle 19 and a toe rest 21, the jack being mounted for forward and rearward swinging movement about an axis at its lower end, as in prior machines of the illustrated type. The jack is preferably controlled by a treadle (not shown) by which the operator may raise it, after swinging it rearwardly to carry the shoe into a heel band 20, to bring the heel seat face of the shoe into contact with shoe-positioning means hereinafter described.

The machine is further provided with mechanism (not shown in detail) of the same general character as disclosed in Letters Patent No. 2,059,241 for swinging the jack farther rearwardly to press the shoe yieldingly against the heel band 20 after the jack has been swung rearwardly and raised by the operator as above described, and with mechanism also substantially like that fully shown and described in the above-mentioned Letters Patent and accordingly not herein shown in detail for operating the jack positively to press the heel end of the shoe more firmly into the heel band 20 after the jack has been operated yieldingly, as well as for closing the heel band and for pressing the shoe yieldingly up against the shoe-positioning means in the power operation of the machine.

For wiping the margin of the upper inwardly over the sole about the heel end of the last, the machine is provided with wipers 22, which are mounted for swinging movements about a common axis. In the power operation of the machine, the wipers 22 are advanced lengthwise of the shoe and are also swung or closed in automatically determined timed relation to their advancing movement by mechanisms including cam paths 24, 26 (Fig. 2) formed in a cam drum 28 fast on a forwardly and rearwardly extending cam shaft 30 mounted in bearings in the frame of the machine, these mechanisms being substantially like those fully disclosed in the above-mentioned Letters Patent, except that the shapes of the cam paths 24 and 26 are such that the wipers receive only a single advancing and closing movement in each cycle of the machine, instead of two such movements as in the machine of said prior Letters Patent.

In the illustrated construction, the wipers 22, comprising substantially flat plates, are each secured to a fastening-guiding block 32 (Fig. 4) which, like the block 404 of the above-mentioned Patent No. 2,059,241, has tongue-and-groove connections 34, 36 with a wiper carrier 38 so that it may be conveniently disconnected from its associated wiper carrier, the blocks 32 being supported by the wiper carriers and being connected thereto by screws (not herein shown). The two wiper carriers 38 are supported on a slide 40 movable forwardly and rearwardly along guideways on the frame of the machine, and each carrier is guided for movement about a central vertical axis by means of a tongue 42 which projects from the carrier into a groove 44 in the slide 40. The wiper carriers are confined on the slide 40 by a cover plate 46 fast on the slide. The slide 40 is moved forwardly to impart to the wipers their advancing movement lengthwise of the shoe by the cam path 24, which engages a roll 48 on a rearward extension of the slide 40.

Figure 4:
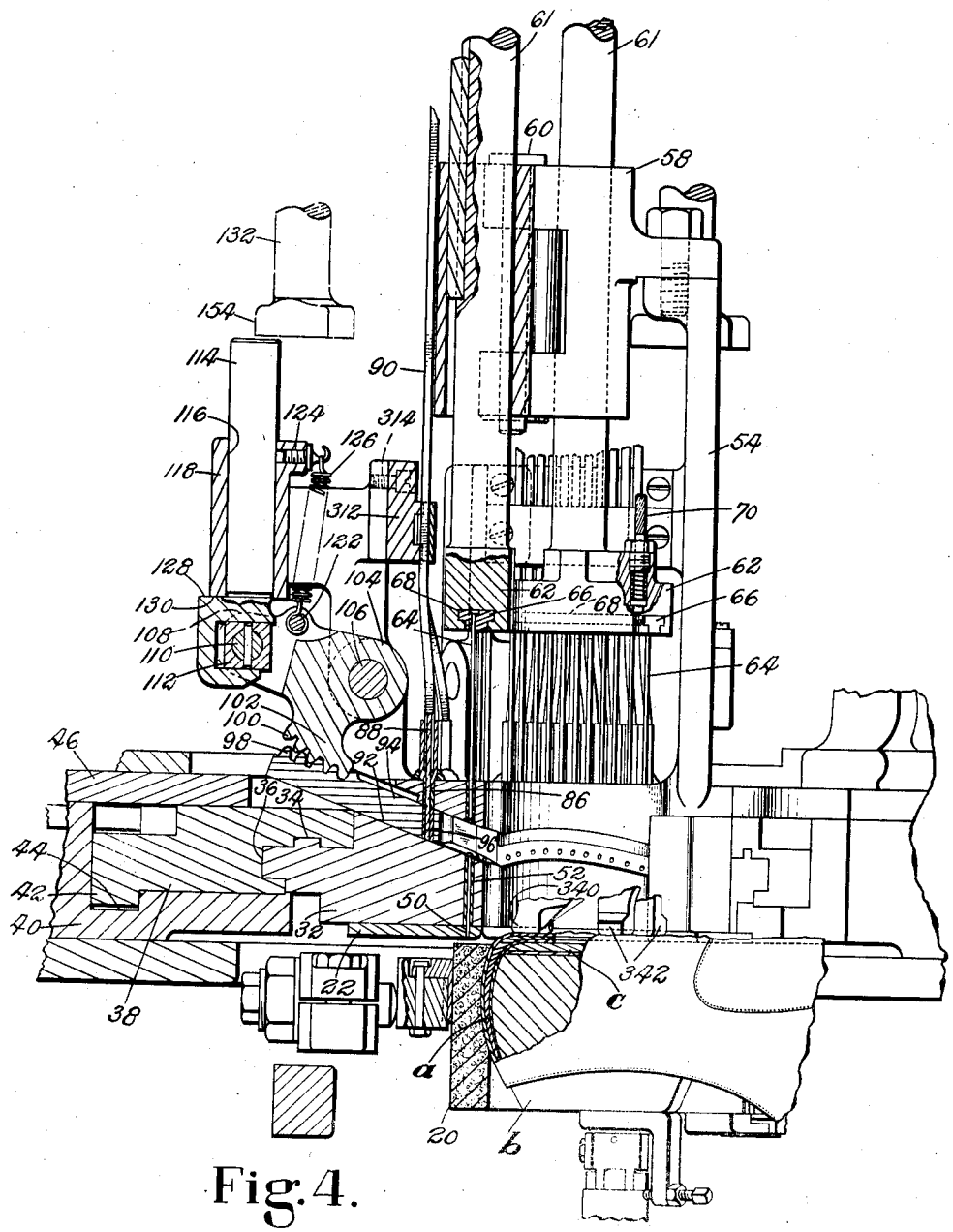
Fig. 4 is a section on the line IV—IV of Fig. 3.

For securing the margin of the upper in over-wiped position in the manner contemplated by the present invention, the illustrated machine is provided with means movable with the wipers inwardly over the bottom of the shoe in fixed relation thereto for forming fastening-receiving holes in the overwiped margin of the upper and in the sole and for driving fastenings into the holes formed in the upper and in the sole. Each wiper 22 is provided with openings 50, one of which is shown in Fig. 4, extending through it in locations near its wiping edge, and formed in each block 32 are a plurality of driver passages 52 in line with the openings 50 in its associated wiper. Fast to each block 32 is an upwardly extending bracket 54 and secured to the upper end of each bracket by screws 56 (Fig. 3) is a block 58, the blocks 58 being connected together by a pivot pin 60 for swinging movements toward and from each other laterally of the shoe about the same vertical axis as the fastening-guiding blocks 32 and the wipers 22. Each block 58 is provided with a vertical bore to receive the upwardly extending shank portion 61 of a tool carrier or driver bar 62, to the lower end of which is secured a row of tools 64, which, as more fully hereinafter explained, act alternately as awls and as drivers and hereinafter, as a matter of convenience, are frequently termed drivers. Each row of drivers 64 is removably mounted in its associated carrier or driver bar 62 by means of a curved T-shaped strip 66 arranged to engage a similarly shaped arcuate slot 68 formed in the driver bar. Each strip 66 is locked against movement relatively to its associated driver bar with the drivers 64 in alinement with the driver passages 52 in the block 32 by means of a spring-pressed pin 70 (Fig. 4) carried by the driver bar and extending into a recess in the strip 66. It will be evident that by lifting the pin 70 the strip 66 and the drivers 64 may be removed, if it is desired to replace one or more of the drivers. The driver bars 62 are slidingly movable in the blocks 58 in directions substantially perpendicular to the plane of the wipers 22 and are held against turning movement in the blocks 58 by keys 72 (Fig. 3). At their upper ends the shank portions 61 of the driver bars 62 are provided with circumferential grooves to receive the inwardly extending forked portions 74 of links 76 (Fig. 1) that are connected at their opposite ends to a link 78, the upper end of which is pivotally connected to the outer end of a driver-operating lever 80 (Fig. 2). At its inner end the lever 80 is pivotally connected to a link 82, the lower end of which is pivotally connected at 84 to the frame of the machine.

Formed also in each fastening-guiding block 32 is a row of passages 86 (Fig. 4) arranged similarly to the driver passages 52, each passage 86 receiving the end of a strip 88 of fiber fastening material guided thereto through a flexible conduit tube 90. Formed in each fastening-guiding block 32 is an inclined guideway 92, in which there is slidably mounted a loader block 94 provided with a row of passages 96. Formed on each loader block 94 are rack teeth 98 engaged by gear teeth 100 formed on the depending arm 102 of a bell crank lever 104. Each bell crank lever 104 is pivotally mounted on a shaft 106 supported by bearings in its associated bracket 54. Each bell crank lever 104 has an outwardly extending forked arm 108 carrying a pin 110 upon which is mounted a block 112 engaged by the forked lower end portion of a plunger 114 which is vertically movable in a bore 116 formed in a yoke 118 secured to the bracket 54 by screws 120 (Fig. 3). Connected at its lower end to a pin 122 carried by the arm 108, and at its upper end to the hook-shaped head of a stud 124 threaded into the yoke 118, is a spring 126 which tends to hold the parts, when the machine is initially at rest, in the positions indicated in Fig. 4 with a shoulder 128 on the plunger 114 in engagement with a finished surface 130 on the yoke 118. When each loader block 94 is in the position shown in Fig. 4, its passages 96 are in alinement with the passages 86 formed in its associated fastening-guiding block 32 to receive the different strips 88 of fiber fastening material, appropriate lengths of which are fed into the passages 96 by mechanism hereinafter described. At the proper time in the cycle of the machine, and preferably after the driver 64 have been operated as awls to form fastening-receiving holes in the overwiped margin of the upper and in the sole in alinement with the openings 50 in the wipers 22, each bell crank lever 104 is swung in response to downward movement of its associated plunger 114 in a direction to move each loader block 94 from the position shown in Fig. 4 to the position shown in Fig. 14 to sever those portions of fiber fastening material fed into the passages 96 in each block 94 and to bring them into alinement with the driver passages 52 in the fastening-guiding blocks 32 and the openings 50 in the wipers ready to be inserted upon the next reciprocation of the drivers 64.

For thus operating the plungers 114 to impart to the bell crank levers 104 their swinging movements, there are vertically movable in bearings in the frame of the machine rods 132, each of which has pivotally connected to its upper end a link 134 (Figs. 1 and 2). At their upper ends, the links 134 are pivotally connected by studs 136 to the outer forked ends of a two-armed lever 138, which is pivotally connected at 140 to the frame and has a rearwardly extending arm 142 connected by a link 144 (Figs. 2 and 7) to a slide 146 vertically movable in guideways formed in the frame. At its lower end the slide 146 carries a roll 148 engaged by a path cam 150 formed in the rear face of a cam block 152 fast on the shaft 30. The shape of the cam 150 is such that after the wipers 22 have completed their advancing and closing movements to wipe the margin of the upper inwardly over the bottom face of the sole and after the tools 64 have been reciprocated to form fastening-receiving holes in the over-wiped margin of the upper and the sole, the lever 138 is swung about its pivot 140 in a direction to impart downward movement to the rods 132. It will be understood that prior to this movement of the rods 132 the plungers 114 carried by the brackets 54 will have been moved, in response to the advancing and closing movements of the wipers, into positions to be engaged by the rods. Accordingly, downward movement of the rods 132 acts, through the plungers 114, to swing the bell crank levers 104 in directions to move the loader blocks 94 into the positions shown in Fig. 14. This movement of the loader blocks severs the fiber pegs and positions them in alinement with the driver passages 52 in the blocks 32 and the openings 50 in the wipers 22. It will be understood also that in machines of the type herein illustrated the closed positions of the wipers may be varied in operating on shoes of different widths by varying their initial open positions. Any variation in the closed positions of the wipers, however, will effect a corresponding variation in the positions of the plungers 114 at the time when the rods 132 receive their downward movement. In order that the plungers 114 will be engaged by the rods 132 regardless of variations in the positions of the plungers because of variations in the closed positions of the wipers, the rods 132 are provided at their lower ends with elongated portions 154 (Figs. 2 and 4). The mechanism for adjusting the wipers preliminarily toward or from each other about the axis of their closing movements for shoes of different widths is not herein shown in detail, since it is fully disclosed in said prior Letters Patent No. 2,059,241, this mechanism being controlled by means of a hand crank 156 (Fig. 1).

Figure 8:
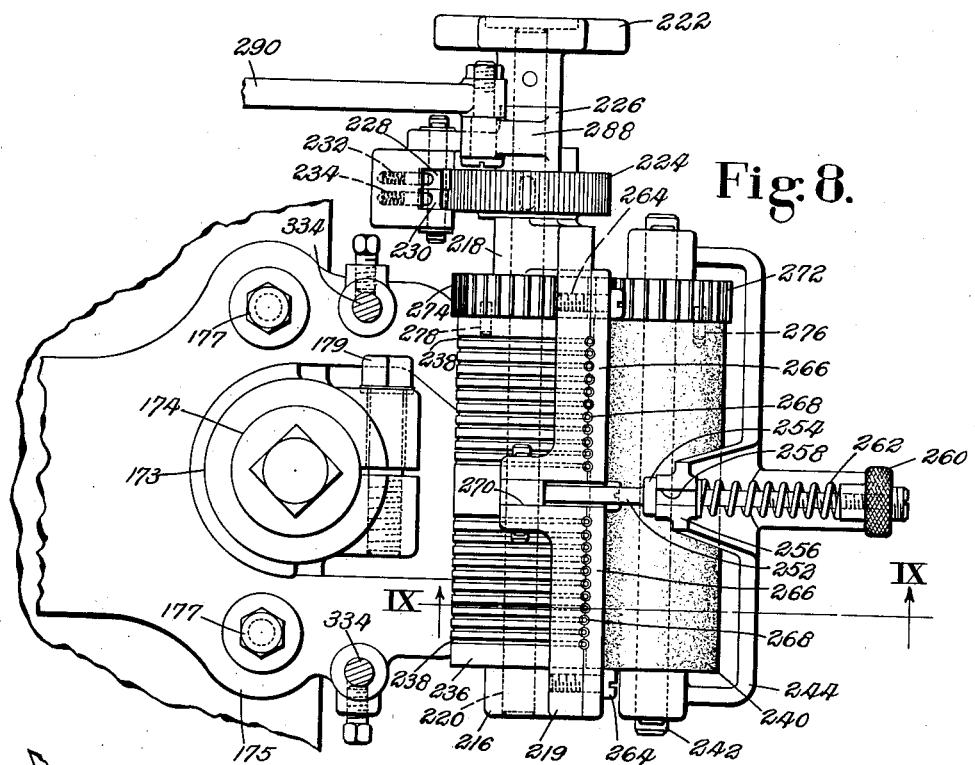
Fig. 8 is a plan view of the fastening-feeding mechanism.

It will be evident that the tools 64 are operated as awls to form fastening-receiving holes in the overwiped margin of the upper and in the sole and as drivers to drive the severed portions of the fastening material into the holes formed in the upper and the sole by downward swinging movements of the driver-operating lever 80 about its connection to the link 82, the lever 80 acting on the tools 64 through the link 78 which may swing forwardly and rearwardly to maintain an operative relation to the driver bars 62 in all positions of the wipers 22. The driver-operating lever 80 is controlled by a cam 158 fast on the forward end of the cam shaft 30 (Fig. 12). This cam acts to raise the lever 80 twice in each cycle of the machine through a plunger 160 vertically movable in a bearing in the frame and pivotally connected near its upper end to the lever 80, the plunger having at its lower end a roll 162 engaged by the cam 158. It will be understood that when each of the high points 164, 166 of the cam 158 (Fig. 12) passes the roll 162, the plunger 160 is suddenly released to permit the lever 80 to swing downwardly and operate the tools 64. For imparting such downward movement to the lever 80, there is provided, in the construction herein shown, a comparatively heavy spring 168 (Fig. 2) located within a central recess 170 formed in the upper portion of the plunger 160, the spring 168 engaging at its upper end a shoulder 172 formed on a thimble 174 threaded in a split boss 173 formed on a bracket 175 secured by screws 177 to the top of the frame. By adjustment of the thimble upwardly or downwardly in the boss 173, the stress of the spring 168 may be varied, a binding screw 179 (Fig. 8) being provided for drawing the two parts of the split boss 173 together to lock the thimble in adjusted position.

In order to limit the operative movement of the tools 64 the driver-operating lever 80 carries a stop member 176 which, when the tools 64 serve as awls, is arranged to engage an abutment, illustrated as leather washers 178 mounted in a recess in the frame. The stop 176 (Fig 2) is threaded on a short rod 180 pivotally connected to the lever 80 and has a reduced end portion 182 extending downwardly through openings in the leather washers 178 and in the frame. The upper portion of the stop member 176 is formed in two halves connected together by a binding screw 184, so that the two halves may be moved toward each other to lock the stop member in adjusted position on the threaded rod 180. It will be evident that after loosening the binding screw 184, the stop member may be turned to adjust it downwardly or upwardly and thus to vary the limit of operative movement of the tools 64, the stop member being preferably so adjusted that when the tools are operating as awls they will pass beyond the bottom faces of the wipers 22 a distance equal to the depth which they should penetrate into the work and which normally is substantially the combined thicknesses of the various layers of the overwiped marginal portions of the shoe upper materials and the sole.

When the tools 64 serve as drivers, however, their downward movement is limited by a spacing member 186, which is moved automatically into position to be engaged by the stop 176 in response to the swinging movement of the lever 138. The spacing member 186 is shaped, as shown particularly in Fig. 10, to straddle the reduced end portion 182 of the stop 176 and is movable along a shelf 188 (Fig. 2) on the frame with its bottom face located substantially in the plane of the upper face of the washers 178. The plunger 160 (Figs. 2 and 10) is cut away to provide clearance for the spacer member 186, which is secured to the outer curved end of a slide 190 horizontally movable in guideways 192 formed in the frame of the machine. At its opposite end, the slide 190 is connected by a short link 194 (Fig. 2) to the depending arm of a bell crank lever 196 pivotally connected to the frame and having a rearwardly extending arm 198 connected by a short link 200 to a lever 202 pivotally connected between its ends at 204 to the frame and having its rear end connected by an upwardly extending link 206 to the lever 138. It will be evident that, as the lever 138 is swung in a clockwise direction, as viewed in Fig. 2, the spacing member 186 through the above-described connections will be moved forwardly, the construction being such that as the lever 138 completes its swinging movement the spacing member will be in position over the washers 178 where it will be engaged by the stop 176 in the next reciprocation of the tools 64. As previously pointed out, the lever 138 is thus swung substantially at the time when the tools 64 have completed their first reciprocation to form fastening-receiving holes in the overwiped margin of the upper and in the sole and before the high point 166 on the cam 158 passes the roll 162 on the plunger 160. The thickness of the spacing member 182 is preferably substantially the same as the combined thicknesses of the overwiped marginal portions of the upper materials and the sole. As the high point 166 of the cam 158 passes the roll 162 to release the driver-operating lever 80 again to the action of the spring 168 to operate the tools 64 as drivers to insert the fastenings, the lever 80 will receive a shorter movement by reason of the engagement of the stop 176 with the spacing member 186. Thus the tools 64, when acting as drivers, receive a downward movement of less extent than when operating as awls, the downward movement of the drivers being arrested when their lower ends are substantially flush with the bottom or wiping faces of the wipers 22. As the lever 138 is swung reversely after the fastenings have been inserted by the drivers, the spacing member 186 is returned to its initial position.

Figure 11:
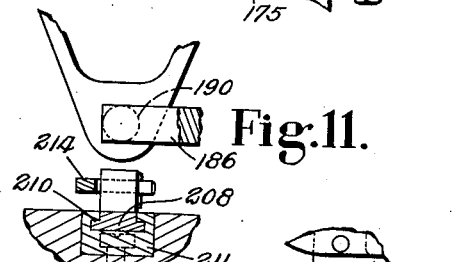
Fig. 11 is a section on the line XI—XI of Fig. 10.
Figure 10:
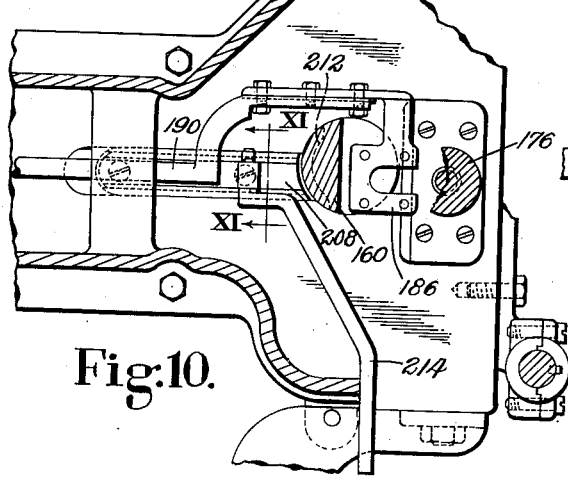
Fig. 10 is a view partly in plan and partly in section showing a portion of the means for varying the stroke of the fastening-inserting tools and means for preventing operation of the tools.

The machine is also provided with means for preventing the movements of the tools 64, if it is desired to run the machine without driving any fastenings. For this purpose, there is provided a locking member 208 slidably mounted in a guideway 210 (Fig. 11) in a block 211 secured to the frame and movable into position to engage the plunger 160 in a recess 212 in the plunger to prevent movement of the driver-operating lever 80 (Fig. 10). The locking member 208 may be thus moved by means of a rod 214, which extends forwardly and laterally of the machine into a position within convenient reach of the operator.

Figure 9:
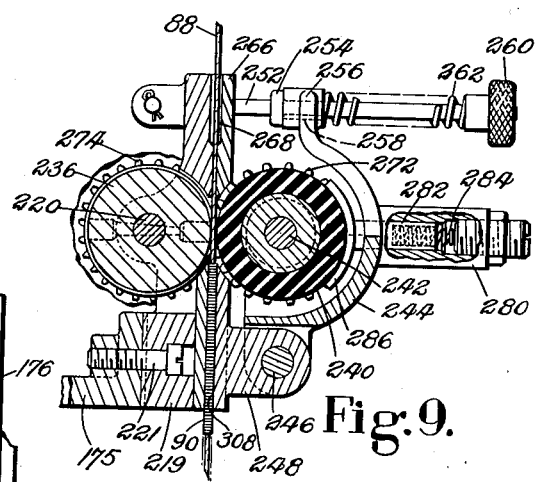
Fig. 9 is a section on the line IX—IX of Fig. 8.

The mechanism for feeding appropriate lengths of the different strips 88 of fiber fastening material into the passages 96 of the loader blocks 94 will now be described. Rotatably mounted in bearings 216, 218 (Fig. 8) in a bracket 219 secured to the bracket 175 by screws 221, one of which is shown in Fig. 9, is a laterally extending shaft 220 having fast to its outer end a hand wheel 222. Mounted on the shaft 220 between the hub of the hand wheel 222 and the bearing 218 is a ratchet wheel 224 which is fast to the shaft and a lever 226 loosely journaled on the shaft. Pivoted to the lever 226 are two pawls 228, 230, urged by springs 232, 234 into engagement with the ratchet wheel 224, the relation of the pawls being such that when one of them is in operative relation to one of the teeth of the ratchet wheel the other pawl will be located in a position intermediate between two of the teeth so that the control of the ratchet wheel 224, through the pawls 228, 230, is as delicate as that which would be provided by a single pawl operating against ratchet teeth only half as large as those actually provided. Pinned to the shaft 220 is a metal cylinder 236 provided with a series of approximately semicircular grooves 238, the bottom surfaces of which may be knurled or roughened more effectively to engage the strips of fiber fastening material which pass through the respective grooves. Cooperating with the cylinder 236 is a roll 240 of rubber, or other suitable material, mounted on a shaft 242 carried by a bracket 244. The bracket 244 is pivoted at 246 (Fig. 9) to a plate 248 secured to the bracket 219 by screws 250 (Fig. 1), so that it may be swung downwardly out of cooperative relation to the cylinder 236 to permit the strips 88 of fiber fastening material to be entered freely in the grooves 238 in the cylinder 236, and upwardly to carry the roll 240 into engagement with the strips 88. Pivotally connected to the bracket 219 is a rod 252 having formed thereon a collar 254 arranged, by engagement with a boss 256 on the bracket 244, to determine the uppermost position of the bracket. When the bracket 244 is in engagement with the collar 254, the rod 252 extends through a slot 258 in the boss 256 and surrounding the rod between the boss 256 and a nut 260 threaded on the outer end portion of the rod is a spring 262, which tends to hold the boss 256 in engagement with the collar 254. With the bracket 244 thus positioned, the strips 88 of fiber fastening material are pressed by the roll 240 yieldingly into the grooves 238 in the metal cylinder 236.

Fastened to the bracket 219 by screws 264 are plates 266 and formed partly in the plates 266 and partly in the bracket 219 are passages 268 for guiding the strips 88 of fastening material to the grooves 238 in the cylinder 236. The bracket 219 is provided with a slot 270 to permit the rod 252 to be swung upwardly when it is desired to lower the bracket 244 and to move the roll 240 out of engagement with the strips 88 of fiber fastening material. The roll 240 is of the same diameter as the cylinder 236 and when the bracket 244 is in the position shown in Fig. 9 the roll and cylinder are connected together by equal gears 272, 274, the gear 272 being mounted on the shaft 242 and connected to the roll 240 by a pin 276 and the gear 274 being mounted on the shaft 220 and connected to the cylinder 236 by a pin 278. Slidably mounted in a boss 280 on the bracket 244 is a plunger 282 which is urged by a spring 284 toward the roll 240. The plunger has a curved end portion 286 which acts by frictional engagement with the roll 240 to prevent any accidental rotation of the roll and the gear 272 as the roll is moved into cooperative relation to the cylinder 236, such as might tend to cause a slight feeding movement of the strips 88 of fiber fastening material. Pivotally connected to an upwardly extending arm 288 on the lever 226 is a link 290 (Fig. 2) adjustably connected at its rear end to the upwardly extending arm 292 of a lever 294 fulcrumed at 204 to the frame and having a rearwardly extending arm 296 connected by a link 298 to a slide 300 vertically movable in guideways in the frame and carrying a roll 302 engaging a cam path 304 formed in the rear face of the cam block 152 (Fig. 7).

Thus it will be seen that whenever the cam 304 imparts to the lever 226 through the above-described connections a swinging movement in a direction to rotate the ratchet wheel 224 and the shaft 220 in a clockwise direction, as viewed in Fig. 9, which takes place early in each cycle of operations of the machine at a time when each loader block 94 is in the position shown in Fig. 13 with the passages 96 of the block in alinement with the passages 86 in its associated fastening-guiding block 32, the cylinder 236 and the roll 240 will be rotated in directions to feed suitable lengths of fastening material downwardly into the passages 96 of each loader block 94. The strips 88 of fiber fastening material are guided from the rolls 236, 240 by the flexible conduit tubes 90 that are supported at their upper ends in passages 308 formed partly in the plate 248 and partly in the bracket 219. The tubes 90 extend downwardly through passages formed in plates 312 secured by screws 314, one of which is shown in Fig. 4, to the brackets 54 and into passages 316 formed in bushings 318 (Figs. 13 and 14) secured to the fastening-guiding blocks 32 with the passages 316 in alinement with the passages 86 in the blocks. As herein shown the various strips 88 of fiber fastening material are wound upon two reels 320, 322 located one at each side of the machine, the reels being carried by brackets 324 secured to the frame of the machine by studs 326. From each of the reels 320, 322 the strips of fiber fastening material extend upwardly and thence through curved guiding members 328 downwardly through the passages 268 to the feed rolls 236, 240. The guiding members 328 are supported by brackets 330 (Fig. 2) supported, in turn, by rearwardly extending arms 332 fast to the upper ends of rods 334 which extend upwardly from the bracket 175. The length of the fastening material fed may be varied by adjustment of the link 290 to vary the effective length of the arm 292 of the lever 294, this arm being provided with an elongated slot 336 through which extends the shank portion of a binding screw 338 carried by the link 390.

In the illustrated machine the shoe-positioning means comprises a plurality of shoe rests or presser feet positioned in the path of movement of the wipers and arranged by engagement with inturned portions of the margin of the upper at the end and at opposite sides of the heel seat of the shoe to position each shoe with its heel seat face in a plane substantially parallel to the plane of the wiper 22. As herein shown, there is provided a shoe rest 340 for engaging at the extreme rear end of the shoe the inturned portion of the upper which has been previously secured to the sole by means of an assembling tack, and shoe rests 342 for engaging inturned portions of the upper close to the opposite side edges of the shoe bottom just rearwardly of the heel breast line (Fig. 3). The shoe rest 340 is formed on a lever 344 connected by parallel links 346, 348 to a bar 350 vertically movable in guideways formed in the frame of the machine. Formed on the link 346 is a rearwardly and upwardly extending arm 352 between which and a pin 354 projecting from the bar 350 there extends a spring 356 which tends to swing the links in a clockwise direction (Fig. 13), the rearward and heightwise position of the shoe rest 340 being determined by the engagement of a stop 358 on the link 348 with a finished surface 360 on the bar 350. Each shoe rest 342 is formed on a lever 362, each of which is pivotally connected by means of a pin 364 to a forward extension of the bar 350. Formed on the hub portion of each lever 362 are segment teeth 366 (Fig. 3) engaging rack teeth 368 formed on an adjustable slide 370. Secured to the forward extension of the bar 350 by screws 372 (Fig. 13) is a plate 374 on which is formed a forwardly extending boss 376 which is bored to receive the slide 370. The slide 370 has a forwardly extending reduced shank portion 378 on the outer end of which are threaded a nut 380 and a lock nut 382. The nut 380 is held in engagement with the end face 384 of the boss 376 by a spring 386 which surrounds the shank portion 378 of the slide 370 within the bore and which bears at one end against a shoulder 388 on the boss 376 and at the other end against a shoulder 390 on the slide 370. It will be evident that by loosening the nut 382 and turning the nut 380 the slide 370 may be moved either forwardly or rearwardly to adjust the levers 362 and the shoe rests 342 toward or from each other for shoes of different widths.

In the power operation of the machine the jack is swung rearwardly to press the heel end of the shoe yieldingly against the heel band 20 and the heel band is closed about the heel end of the shoe before the margin of the upper is wiped inwardly over the insole by the wipers 22. As the jack is thus swung, the bar 350 and the presser feet 340, 342 receive a short downward movement to depress the shoe in the heel band and to cause the band to wipe the upper toward the edge of the bottom face of the last. The mechanism for thus operating the bar 350 is not herein shown in detail since it is substantially like that fully shown and described in the above-mentioned Letters Patent for operating the usual holddown, this mechanism being controlled by a face cam 392 formed on the forward end of the cam drum 28. The shape of the cam 392 is such that the bar 350 and the presser feet are permitted to rise slightly in response to upward pressure of the shoe against the presser feet after the wipers have been moved inwardly over the edge of the shoe bottom to cause an increased pressure of the wipers on the upper, this pressure being increased by further upward movement of the jack post 18 during the inward movement of the wipers to cause them to wipe and compact the margin of the upper on the sole. When the wipers 22 are moved inwardly over the heel seat, they engage the presser feet 340, 342 and push them inwardly over the heel seat, the presser foot 340 moving lengthwise of the shoe against the resistance of the spring 356, and the presser feet 342 being swung toward each other laterally of the shoe against the resistance of the spring 386. Thus, the presser feet not only assist in maintaining the heel seat face of the shoe in a plane parallel to the plane of the wipers and in predetermined heightwise relation to the wipers, but, as they move inwardly, they act to smooth the upper materials in front of the wipers, the presser foot 340 tending to prevent any pinching or pleating of the upper by the wipers as the wipers are swung about their common axis and the presser feet 342 tending to hold the margin of the upper at the opposite sides of the heel breast line against forward displacement.

In order to permit each shoe to be positioned with its heel seat face substantially parallel to the plane of the wipers, the heel pin 19 in the construction herein shown is carried by a block 394 and extends upwardly through an enlarged opening in a plate 396 which is arranged to engage the top face of the cone of the last (Fig. 5). The plate 396 is provided with downturned flanges 398 (Fig. 6) having arcuate lower edges supported on similarly curved shoulders 400 of the block 394. The plate 396 is provided with pins 402 extending into arcuate slots 404 in the block to limit their relative tipping movements. The shoulders 400 of the block 394 are curved about an axis extending laterally of the shoe and, by movement of the plate 396 on the shoulders 400, a tipping movement may be imparted to the shoe in the upward movement of the jack post 18 to bring its heel seat face into engagement with the presser feet 340, 342. As the heel end of the shoe is thus moved into engagement with the presser feet, its toe end will be unsupported by the toe rest 21 which may be utilized merely to prevent excessive downward tipping movement of the shoe when the shoe is mounted on the jack. If desired, the toe rest may be removed from the machine and the initial position of the shoe controlled by the engagement of an adjustable screw 406 carried by downwardly extending portion 408 of the plate 396 with a collar 410 on the jack post 18. It is contemplated that the looseness between the heel pin 19 and the spindle holes in the heel ends of different lasts will permit such slight lateral tipping movements of the shoes as are necessary to position the opposite sides of their heel ends in engagement with the presser feet 342.

In the illustrated construction, the block 394 is supported by parallel links 412, 414 connected at their lower ends to the jack post 18. Extending inwardly one from each side of the jack post are recesses 416 in which there are seated springs 418, 420, the spring 418 engaging a pin 422 carried by the link 412 and the spring 420 engaging a pin 424 carried by the link 414. The springs 418, 420 tend normally to centralize the links 412, 414 and the spindle 19 with respect to the jack post 18 but are arranged to yield to permit the spindle and the shoe to be moved bodily in either direction laterally as the heel band is closed about the heel end of the shoe. The heel end of the shoe is thus centralized relatively to the wipers by the heel band while the band applies substantially equal pressures to the upper at the opposite sides of the shoe. It will be understood that as the shoe is thus moved, the parallel links 412, 414 prevent tipping movement of the spindle so that the heel seat face of the shoe is maintained in a plane parallel to the plane of the wipers 22.

In the operation of the machine briefly summarized, the operator mounts the shoe on the jack, swings the jack rearwardly to carry the heel end of the shoe into the heel band 20, and raises the jack post 18 to force the heel seat face of the shoe against the presser feet 340, 342. As the jack post is raised, the shoe is first engaged by the presser foot 340 and is tipped lengthwise in a diretcionto raise its toe end out of engagement with the toe rest 21 until inturned portions of the margin of the upper at the opposite sides of the shoe just rearwardly of the heel breast line are engaged by the presser feet 342. With the shoe thus positioned, the operator starts the machine, whereupon the jack is swung farther rearwardly to press the shoe more firmly against the heel band 20 and the presser feet 340, 342 are moved downwardly to cause the heel band to wipe the upper upwardly toward the edge of the heel seat. At this time also the feed rolls 236, 240 are rotated in directions to feed suitable lengths of fastening material downwardly into the passages 96 of the loader blocks 94. The heel band is then closed yieldingly against the sides of the shoe and the jack is forced still more firmly back against the heel band and the shoe is pressed more firmly against the presser feet through the post 18, after which the wipers 22 are advanced and closed to wipe the margin of the upper materials inwardly over the sole. As the wipers begin their advancing and closing movements and substantially at the time when they have been moved inwardly just over the edge of the shoe bottom, the presser feet 340, 342 are raised to a slightly higher level by the action of the usual spring (not shown) on the post 18, this spring being further compressed as the wipers continue to move inwardly over the sole progressively to increase the pressure of the wipers on the margin of the upper materials. As the wipers 22 complete their advancing and closing movements, the driver-operating lever 80 is released to the action of the spring 168 to operate the tools 64 to form fastening-receiving holes in the overwiped margin of the upper and in the sole in alinement with the openings 50 in the wipers, after which the lever 80 is raised to retract the tools 64. The spacing member 186 is then moved forwardly into position over the leather washers 178 and the loader blocks 94 are moved relatively to the wipers to sever the portions of fastening material fed into the passages 96 and to move them into alinement with the drivers 64 and the openings 50 in the wipers in response to the swinging of the lever 138. Thereafter, the lever 80 is again released to the action of the spring 168 to operate the drivers 64 to insert the fastenings in the fastening-receiving holes formed in the margin of the upper and in the sole, after which the drivers 64 are retracted, the shoe is released from the pressure of the jack and the heel band, the presser feet are moved downwardly to depress the shoe, and the wipers are then retracted from over the heel seat, all parts returning to their starting positions.

Having described the invention, what I claim as new and desire to secure by Letters Patent of the United States is:

1. A lasting machine having, in combination, wipers movable to wipe the marginal portion of an upper inwardly over a sole about an end of a shoe and provided with a plurality of openings extending through them, and a plurality of tools mounted to move inwardly with said wipers and movable in directions substantially perpendicular to the plane of the wipers first to form fastening-receiving holes in the overwiped margin of the upper and in the sole in alinement with the openings in said wipers and then to drive fastenings through the openings in the wipers and into the fastening-receiving holes formed in the margin of the upper and in the sole to secure the margin in overwiped position.

2. A lasting machine having, in combination, wipers movable to wipe the marginal portion of an upper inwardly over a sole about an end of a shoe and provided with a plurality of openings extending through them, a plurality of tools mounted to move inwardly with said wipers in fixed relation thereto, and means for operating said tools alternately to form fastening-receiving holes in the overwiped margin of the upper and in the sole in alinement with the openings in said wipers and then to drive fastenings through the openings in the wipers and into the fastening-receiving holes formed in the margin of the upper and in the sole to secure the margin in overwiped position.

3. A lasting machine having, in combination, wipers movable to wipe the marginal portion of an upper inwardly over a sole about an end of a shoe and provided with a plurality of openings extending through them, a plurality of drivers mounted to move inwardly with said wipers in fixed relation thereto, means for reciprocating said drivers twice in each cycle of the machine to cause them to form fastening-receiving holes in the overwiped margin of the upper and in the sole in alinement with the openings in the wipers and then to drive fastenings into said holes to fasten the upper in lasted position, and means movable between alternate reciprocations of the drivers to present the fastenings to said drivers.

4. A lasting machine having, in combination, wipers movable to wipe the marginal portion of an upper inwardly over a sole about an end of a shoe and provided with a plurality of openings extending through them, members movable inwardly with said wipers in fixed relation thereto and having a plurality of driver passages in alinement with said openings, drivers in said passages, means for reciprocating said drivers twice in each cycle of the machine to cause them to form fastening-receiving holes in the overwiped margin of the upper and in the sole and then to drive fastenings into said holes to fasten the upper in lasted position, and means for presenting the fastenings to said drivers between alternate reciprocations of the drivers.

5. A lasting machine having, in combination, wipers movable to wipe the marginal portion of an upper inwardly over a sole about an end of a shoe and provided with a plurality of openings extending through them, members movable inwardly with said wipers in fixed relation thereto and having a plurality of driver passages therein in alinement with the openings in said wipers, drivers carried by said members, loader blocks movable relatively to said members to present fastenings in alinement with said passages for the operation of said drivers, and means movable in time relation to the movements of said loader blocks for imparting to said drivers a plurality of reciprocating movements to cause them to form fastening-receiving holes in the overwiped margin of the upper and in the sole prior to the movements of said loader blocks to present the fastenings and then to drive the fastenings presented by said loader blocks into said holes to fasten the upper in lasted position.

6. A lasting machine having, in combination, wipers movable to wipe the marginal portion of an upper inwardly over a sole about an end of a shoe and provided with a plurality of openings extending through them, members movable inwardly with said wipers in fixed relation thereto and having a plurality of driver passages in alinement with said openings, drivers in said passages, means for reciprocating the drivers to form fastening-receiving holes in the overwiped margin of the upper and sole and then to drive fastenings into said holes to fasten the upper in lasted position, loader blocks having a plurality of passages formed therein to receive the fastenings, and means for moving said loader blocks from fastening-receiving positions into positions to present the fastenings in alinement with the drivers between alternate reciprocations of the drivers.

7. A lasting machine having, in combination, wipers movable to wipe the marginal portion of an upper inwardly over a sole about an end of a shoe and provided with a plurality of openings extending through them, a plurality of tools mounted to move inwardly with said wipers in fixed relation thereto, means for operating said tools alternately as awls and as drivers to form fastening-receiving holes in the overwiped margin of the upper end in the sole in alinement with the openings in said wipers and then to drive fastenings into said holes to fasten the upper in lasted position, and means movable between the work-penetrating and driving strokes of said tools for severing fastenings from the ends of a plurality of strips of fastening material and presenting the fastenings in alinement with the openings in said wipers.

8. A lasting machine having, in combination, wipers movable to wipe the marginal portion of an upper inwardly over a sole about an end of a shoe and provided with a plurality of openings extending through them, members movable inwardly with said wipers and provided with a plurality of driver passages in alinement with the openings in said wipers and a plurality of passages for the reception of the ends of a plurality of strips of fiber fastening material, a plurality of drivers mounted in said driver passages, means for imparting to said drivers a plurality of reciprocating movements to cause them to form fastening-receiving holes in the overwiped margin of the upper and in the sole and then to drive fiber pegs into said holes to fasten the upper in lasted position, and loader blocks provided with a plurality of passages arranged to be positioned in alinement with the fastening-material-receiving passages in said members, said blocks being movable between alternate reciprocations of said drivers transversely of said passages to sever pegs from the fastening material and to transfer the severed pegs into alinement with the driver passages.

9. A lasting machine having, in combination, wipers movable to wipe the marginal portion of an upper inwardly over a sole about an end of a shoe, a plurality of tools mounted to move inwardly with said wipers, and means for operating said tools alternately as awls and as drivers to form fastening-receiving holes in the overwiped margin of the upper and in the sole in predetermined relation to the inner edges of said wipers and then to drive fastenings into said holes to fasten the upper in lasted position.

10. A heel-end lasting machine having, in combination, a pair of wipers mounted for swinging movements to wipe the margin of an upper inwardly over a sole about the heel end of a shoe, each of said wipers having a plurality of openings extending through it and a member secured in fixed relation thereto provided with a plurality of driver passages in alinement with the openings in the wiper, drivers mounted in said driver passages, a pair of loader blocks movable relatively to the wipers at the end of their overwiping movements to position a fastening in alinement with each of the drivers, and means for operating the drivers to drive the fastenings through the upper and into the sole to fasten the upper in lasted position.

11. A heel-end lasting machine having, in combination, a pair of wipers mounted for swinging movements to wipe the margin of an upper inwardly over a sole about the heel end of a shoe, each of said wipers having a plurality of openings extending through it, a member secured in fixed relation to each of said wipers and provided with a plurality of driver passages in alinement with the openings in the wiper and a plurality of passages for the reception of the ends of a plurality of strips of fiber fastening material, drivers mounted in said driver passages, a pair of loader blocks provided with a plurality of passages arranged to be positioned in alinement with the fastening-material-receiving passages in said members, said blocks being movable relatively to the wipers to sever fiber pegs from said material and to position the pegs in alinement with the drivers, and means for operating the drivers to drive the fiber pegs through the upper and into the sole to fasten the upper in lasted position.

12. A lasting machine having, in combination, wipers movable to wipe the marginal portion of an upper inwardly over a sole about an end of a shoe, a plurality of tools mounted to move inwardly with said wipers in fixed relation thereto, and mechanism for imparting to said tools a plurality of reciprocating movements of different lengths to cause them first to form fastening-receiving holes in the overwiped margin of the upper and in the sole and then to drive fastenings into said holes to fasten the upper in lasted position.

13. A lasting machine having, in combination, wipers movable to wipe the marginal portion of an upper inwardly over a sole about an end of a shoe, a plurality of tools mounted to move inwardly with said wipers, a lever for operating the tools alternately as awls and as drivers, means for imparting to said lever a plurality of swinging movements, a stop, and means for engaging said stop at different times to vary the extent of its swinging movements and thereby to vary the stroke of the tools.

14. A heel-end lasting machine having, in combination, wipers movable to wipe the marginal portion of an upper inwardly over a sole about the heel end of a shoe, a plurality of tools mounted to move inwardly with said wipers, a lever connected to said tools for operating them alternatively as awls and as drivers, cam-controlled means for imparting to said lever a plurality of swinging movements, a stop carried by said lever, and separate means for engaging said stop in alternate swinging movements of said lever to vary the limit of its swinging movements and thereby to vary the stroke of said tools.

15. A heel-end lasting machine having, in combination, wipers movable to wipe the marginal portion of an upper inwardly over a sole about the heel end of a shoe, a plurality of tools mounted to move inwardly with said wipers, a lever connected to said tools and swingable to operate them alternately as awls to form fastening-receiving holes in the overwiped margin of the upper and in the sole and as drivers to insert fastenings into said holes to fasten the upper in lasted position, a cam and a spring cooperating to swing said lever, an adjustable stop, an abutment for engaging said stop to limit the extent of the work-penetrating movement of said tools, and a spacing member movable relatively to said abutment between alternate swinging movements of said lever into position to engage the stop to limit the extent of the movement of the tools to insert the fastenings.

16. A heel-end lasting machine having, in combination, wipers movable to wipe the marginal portion of an upper inwardly over a sole about the heel end of a shoe, a plurality of tools mounted to move inwardly with said wipers in fixed relation thereto, a lever swingable to operate said tools alternately as awls and as drivers, and mechanism for varying the limit of movement of said lever to vary the stroke of said tools comprising a stop carried by said lever, an abutment for engaging said stop, and a spacing member movable alternately into and out of position between the abutment and said stop.

17. A machine for operating on shoes having, in combination, a heel band for clamping a shoe upper about the heel end of a last, a shoe support comprising a spindle for engaging the heel end of the last in its spindle hole, and means for supporting the spindle against tipping movement in directions laterally of the shoe while permitting it to be moved bodily laterally of the shoe in response to pressure of the heel band on the shoe to centralize the heel end of the shoe in said band.

18. A machine for operating on shoes having, in combination, a heel band for clamping a shoe upper about the heel end of a last, a shoe support comprising a spindle for engaging the heel end of the last in its spindle hole, said spindle being mounted for movement in directions laterally of the shoe to permit the heel end of the shoe to be centralized in the machine, and means movable with the spindle and arranged to hold it against tipping movement while permitting it to be moved laterally in either direction in response to pressure of the heel band on the shoe.

19. A machine for operating on shoes having, in combination, a heel band for clamping a shoe upper about the heel end of a last, a shoe support comprising a spindle for engaging the heel end of the last in its spindle hole, a post for supporting said spindle, and parallel links connecting the spindle and said post arranged to permit bodily movement of the spindle laterally of the shoe in response to pressure of the last on the spindle to centralize the heel end of the shoe in said band.

20. A machine for operating on shoes having, in combination, a heel band for clamping a shoe upper about the heel end of a last, a shoe support comprising a spindle for engaging the heel end of the last in its spindle hole, a post for supporting said spindle, parallel links connecting the spindle and said post, said links being mounted to swing relatively to said post to permit bodily movement of the spindle in directions laterally of the shoe to centralize the heel end of the shoe in said heel band, and spring means tending to resist swinging of said links.

21. A machine for operating on shoes having, in combination, a heel band for clamping a shoe upper about the heel end of a last, a shoe support comprising a spindle for engaging the heel end of the last in its spindle hole, a post for supporting said spindle, parallel links connecting the spindle and said post arranged to permit bodily movement of the spindle in directions laterally of the shoe to centralize the heel end of the shoe in said heel band, said post having recesses therein, and springs mounted in said recesses and arranged to act on said links to determine a normal centralized position of the links and the spindle while permitting the spindle to be moved in opposite directions against the resistance of one or the other of said springs.

22. In a heel-end lasting machine, the combination with wipers for wiping the margin of an upper about the heel end of a last into lasted position, of means arranged in the path of movement of said wipers for positioning the shoe and last for the operation of said wipers, said positioning means comprising a plurality of members arranged to engage inturned portions of the margin of the upper at the end and at the opposite sides of the end of the shoe and to be forced inwardly over the margin of the upper by engagement of the wipers therewith.

23. In a heel-end lasting machine, the combination with wipers for wiping the margin of an upper about the heel end of a last into lasted position, of means arranged in the path of movement of said wipers for positioning the shoe and last for the operation of said wipers, said positioning means comprising a member arranged to engage an inturned portion of the margin of the upper at the rear end of the heel seat, and members for engaging inturned portions of the margin of the upper at the opposite sides of the heel seat, said end and side members being movable inwardly over the margin of the upper by engagement of the wipers therewith, and said side members being adjustable toward or from each other to accommodate shoes of different widths.

24. In a heel-end lasting machine, the combination with wipers for wiping the margin of an upper about the heel end of a last into lasted position, of means for positioning the shoe and last for the operation of the wipers, said positioning means comprising presser feet arranged by engagement with inturned portions of the margin of the upper at the extreme end and at the opposite sides of the heel end of the shoe to position the shoe with its heel-seat face in a plane substantially parallel to the plane of the wipers, said end presser foot being movable lengthwise of the shoe and the side presser feet being movable toward each other laterally of the shoe by the engagement of the wipers therewith, and spring means against the resistance of which the end and side presser feet are thus movable.

25. A heel-end lasting machine having, in combination, means for clamping the heel end of a shoe on a last at the opposite sides of the shoe, wipers for wiping the margin of the shoe upper about the heel end into lasted position, shoe-positioning means comprising different members arranged by engagement with the shoe bottom at the rear end and at opposite sides of the heel seat to position the shoe with its heel seat in a plane substantially parallel to the plane of the wipers, and a shoe support movable to press the shoe against said members, said shoe support being constructed to permit the heel end of the shoe to move laterally to adjust itself to the clamping means while maintaining its heel-seat face in the plane determined by said shoe-positioning members.

26. In a heel-end lasting machine, the combination with means for clamping the heel end of a shoe on a last at the opposite sides of the shoe, and wipers for wiping the margin of the shoe upper about the heel end into lasted position, of means arranged by engagement with the bottom of the heel end of the shoe to position the shoe and last for the operation of said wipers, a spindle for engaging the heel end of the last in its spindle hole, parallel links for supporting said spindle against tipping movement in directions laterally of the shoe while permitting its position laterally of the shoe to be varied to centralize the heel end of the shoe in said clamping means, and a plate movable laterally of the shoe with said spindle for engaging the top of the heel end of the last, said plate being mounted for movement relatively to the spindle about an axis extending laterally of the shoe to permit the shoe to be tipped lengthwise by engagement of said shoe-positioning means therewith to position its heel seat in proper relation to the wipers.

27. In a heel-end lasting machine, the combination with means for clamping the heel end of a shoe on a last at the opposite sides of the shoe, and wipers for wiping the margin of the shoe upper about the heel end into lasted position, of shoe-positioning means comprising different members arranged to engage the shoe bottom in different locations around the edge of the heel seat, a spindle for engaging the heel end of the last in its spindle hole, parallel links for supporting said spindle against tipping movement in directions laterally of the shoe while permitting its position laterally of the shoe to be varied to centralize the heel end of the shoe in said clamping means, and a plate movable laterally of the shoe with said spindle for engaging the top of the heel end of the last, said plate being mounted for movement relatively to the spindle about an axis extending laterally of the shoe to permit the shoe to be tipped lengthwise by engagement of said shoe-positioning members therewith to position its heel seat in proper relation to the plane of the wipers.

FRED N. LA CHAPELLE.

CERTIFICATE OF CORRECTION.

Patent No. 2,214,741.                                            September 17, 1940.

FRED N. LA CHAPELLE.

It is hereby certified that error appears in the printed specification of the above numbered patent requiring correction as follows: Page 1, first column, line 7, for the name "J. C. Jorgenson" read --J. C. Jorgensen--: and second column, line 25, for "presses" read --presser--; page 3, second column, line 14, for the word "driver" read --drivers--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.